May 4, 1948.　　　　　G. D. GODWIN　　　　　2,440,821
AUTO TOP LUGGAGE CARRIER
Filed July 8, 1946　　　　2 Sheets-Sheet 2
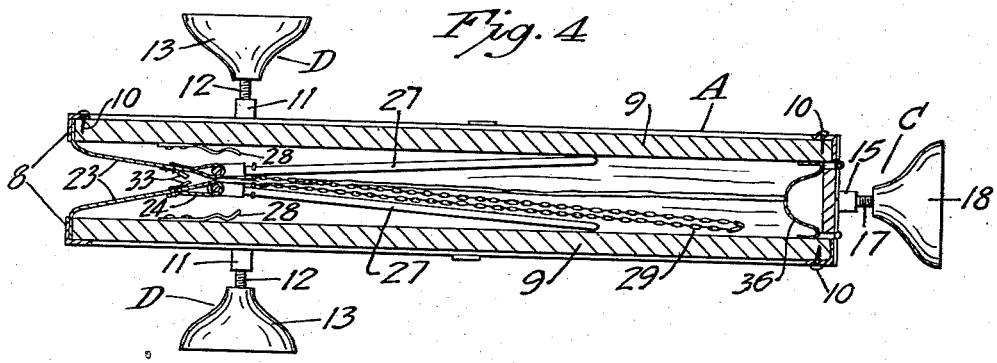
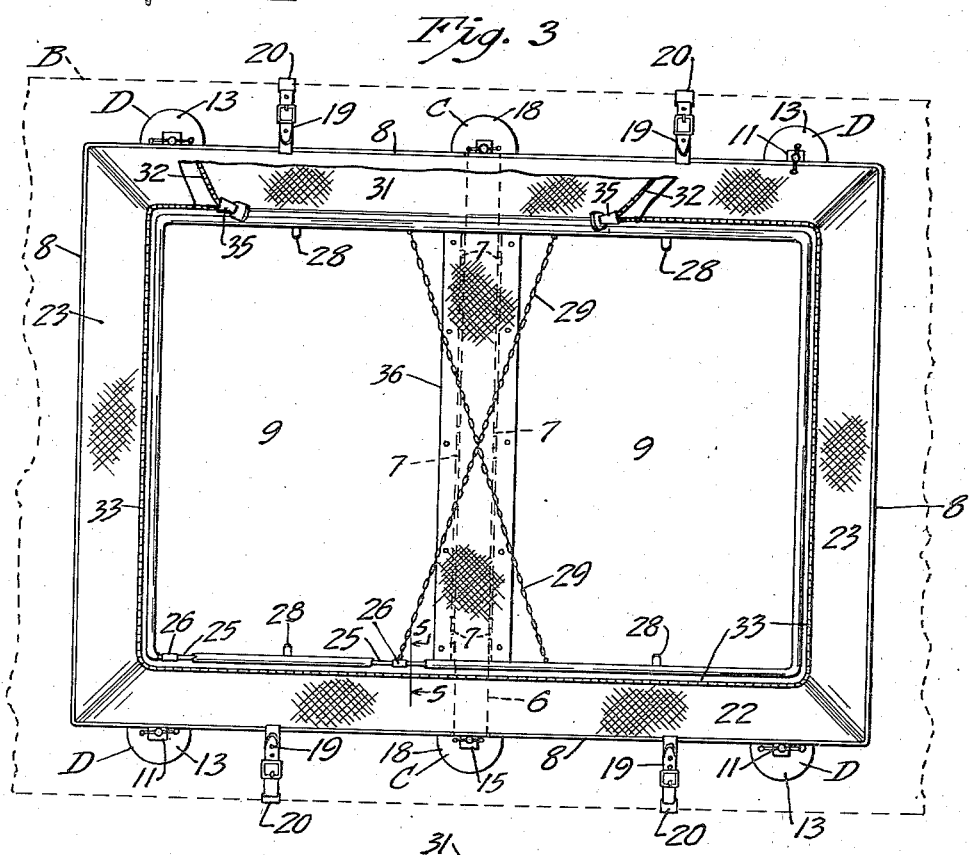
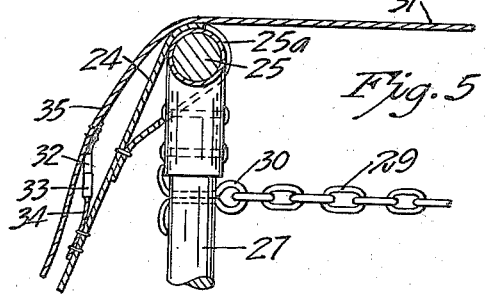
Inventor
Gerald D. Godwin
By Williamson & Williamson
Attorneys Patented May 4, 1948

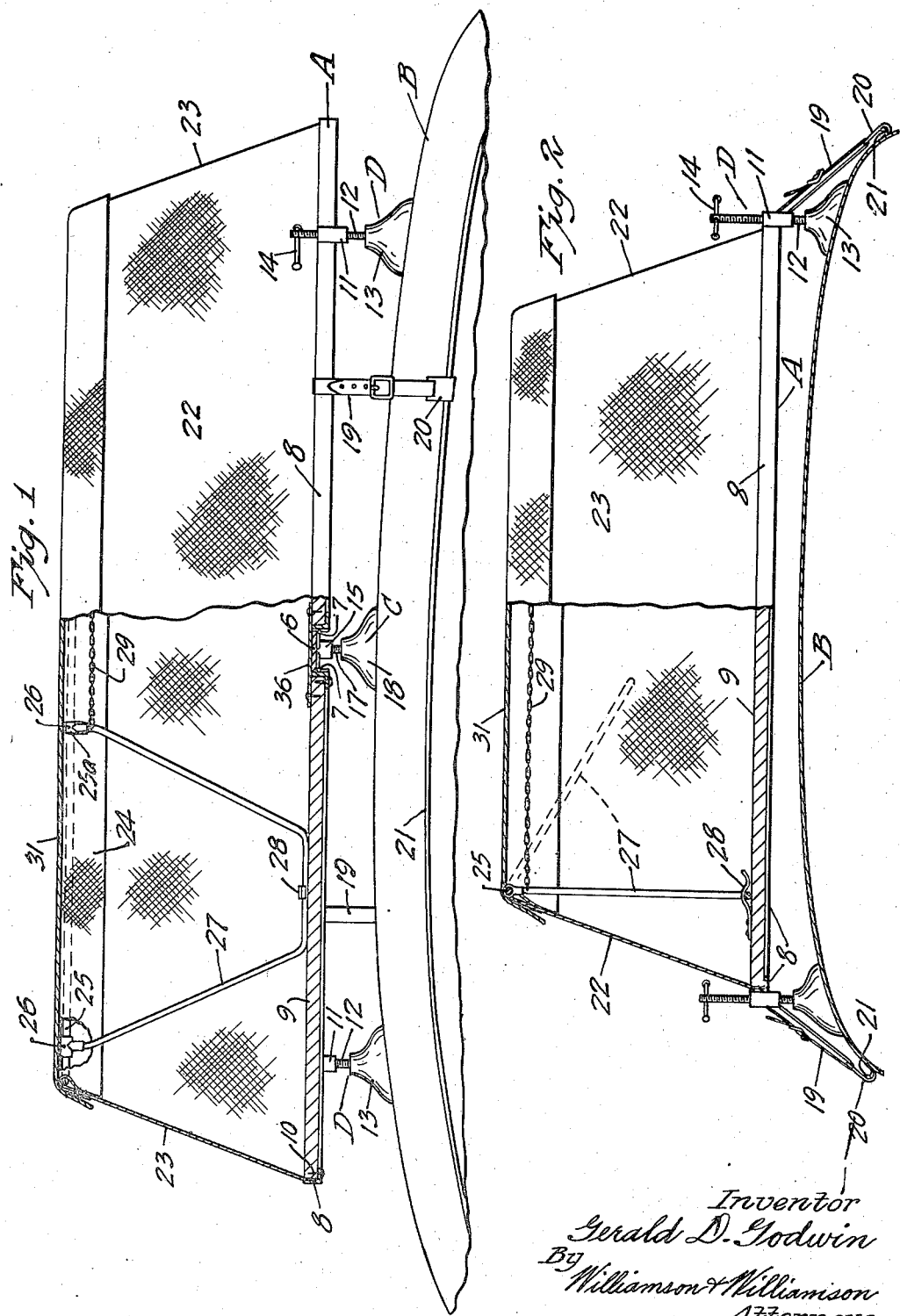

2,440,821

UNITED STATES PATENT OFFICE 2,440,821

AUTO TOP LUGGAGE CARRIER

Gerald D. Godwin, Minneapolis, Minn.

Application July 8, 1946, Serial No. 681,877

9 Claims. (Cl. 224—29)

1

This invention relates to auto top luggage carriers.

It is one of the objects of this invention to provide a novel and improved auto top luggage carrier which can be easily mounted on the top of an automobile, can be collapsed to lie quite closely adjacent the top of a car, or can be extended to permit stowage of a large quantity of luggage within the same.

Another object of the invention is to provide such a luggage carrier which can be easily attached to or removed from an automobile top and which, when removed, can be folded up in a small compass so that it can be stowed away in a small space.

A further object is to provide such an auto top luggage carrier including side and end walls and a cover made of flexible material, such as canvas, and a base to which the side and end walls may be attached, frame members carried by the upper edges of the side and end walls, and means for holding the upper portion of the carrier in extended condition above the base or permitting the collapse of the upper portion of the carrier flat against the base.

The objects and advantages of the invention will more fully appear from the following description made in connection with the accompanying drawings wherein like reference characters refer to the same or similar parts throughout the various views and in which:

Fig. 1 is a view partly in side elevation and partly in vertical longitudinal section showing the luggage carrier in extended position mounted on an automobile top.

Fig. 2 is a view partly in front elevation and partly in transverse section showing the luggage carrier in similar condition.

Fig. 3 is a plan view of the luggage carrier with the cover open and certain parts being broken away, the automobile top being shown in dotted lines.

Fig. 4 is a longitudinal section through the luggage carrier removed from the automobile top and folded up in collapsed condition; and Fig. 5 is a detail in an enlarged scale taken on the line 5—5 of Fig. 3 as indicated by the arrows.

In accordance with the invention there is provided a base designated as an entirety by the letter A. This base includes a central bar 6 connected by hinges 7 at its opposite edges to two main base frames 8 formed of angle iron. The outer flanges of the angle iron forming the main base frames 8 extend vertically and these outer flanges have inwardly extending flanges at their lower edges to form ledges which receive rectangular panels 9, preferably made of wood or other comparatively light weight material. The panels 9 are removably secured to the horizontal flanges of the main frames 8 as by means of screws 10. With this arrangement the base A, consisting of the central bar 6, the main frames 8, and the panels 9, can be disposed in substantially a single horizontal plane as is indicated in Figs. 1 and 2, or the base can be folded up to take the narrow U form shown in Fig. 4.

To support the base A on an automobile top B and to permit leveling of the base irrespective of the contour of the automobile top B, there are preferably provided a pair of central sucker cup equipped jacks C and four end sucker cup equipped jacks D. The jacks D include screw-threaded sockets 11 carried by the sides of the main base frames 8 at the exterior thereof adjacent the ends of these frames and screws 12 work through these sockets and carry at their lower ends sucker cups 13 made preferably of rubber and adapted to engage the top B of the automobile without marking the same and in such manner that they will hold their position on this top. The upper ends of the screws 12 are preferably equipped with handle levers 14, which are slidably received in cross openings at the upper ends of the screws 12 whereby the jacks can be manipulated to raise or lower the level of the main frames 8 to align these main frames properly in substantially the same plane as the central bar 6. Similarly the two central jacks C include screw-threaded sockets 15, which are attached to the ends of the bar 6 and handle equipped screws 17 are received in these sockets 15 and the screws 17 carry at their lower end sucker cups 18 which engage the top surface of the car.

To prevent side movement of the base of the carrier when mounted on a car, buckle equipped adjustable straps 19 are attached to the sides of the main frames 8 and these straps carry at their outer portions hooks 20, which are adapted to catch beneath the drain troughs 21 customarily found on the top B of an automobile. At the points where the straps 19 engage with the main base frames 8, the horizontal flanges of the main base frames are slotted to receive the straps 19.

Secured to the outer edges of the panels 9 are carrier side and end walls 22 and 23 respectively, these walls being made of heavy flexible material, such as canvas, and the ends of the end walls being joined to the neighboring ends of side walls so as to form a continuous structure. The upper edges of the side walls 22 are more closely spaced than the lower edges and the upper edges of the end walls are similarly more closely spaced than their lower edges, whereby, when the side and end walls are extended from the base A in the manner shown in Figs. 1, 2, and 3, opposite walls will flare upwardly as is indicated. A continuous hem 24 is formed around the upper edge of the wall structure produced by the side and end walls 22 and 23, and fitting within this hem are two U-shaped upper frame members 25. These frame members 25 respectively extend across the ends of the wall structure and along the sides of the wall structure but they terminate at their ends short of each other and about even with the inner cross pieces of the main base frames 8. There are both inner and outer brackets 26 pivotally mounted on the upper frame members 25, and each pair of adjacent inner and outer brackets 26 at the sides of the carrier carry bails 27, which run through slots 25a in the hem 24 and have central portions which are adapted to engage beneath spring snaps 28 carried by the panels 9. When the bails 27 are thus engaged with the snaps 28, the bails will be disposed in substantially vertical planes to tightly stretch the side and end walls 22 and 23, thereby holding and retaining the upper portion of the carrier in raised extended position from the base A. By disengaging the bails 27 from the spring snaps 28 and swinging the bails as from the full line position shown in Fig. 2 to the dotted line position there shown, the upper part of the carrier can be collapsed downwardly against the base A so that the carrier may be held in collapsed condition.

To brace the inner end portions of the upper frames 25 when the carrier is in extended position, a pair of cross chains 29 are provided, and these cross chains respectively extend between the inner portion of one of the bails 27 attached to one of the upper frame members 25 at one side of the carrier to the inner end of an opposite bail 27 attached to the other upper frame member 25 at the other side of the carrier. To secure the chains 29 to the bails 27 cotter keys 30 are employed for connection with the outermost links of the chains 27 and these keys run through holes bored in the bails 27.

A top cover 31 formed preferably of canvas or other heavy flexible material, is stitched for a distance along one side of the carrier to the outer portion of a side wall 22 just below the hem 24, the stitched portion being shown in full lines in Fig. 3. The cover 31 is of rectangular shape and adjacent other portions of its edges it has secured thereto a slide fastener tape 32 carrying the usual teeth adapted to engage with the teeth on a co-operating slide fastener tape 33 secured to a strip 34 of flexible material stitched to the side and end walls 22 and 23 below the hem 24. Of course the strip 34 does not extend across the space where the cover 31 is stitched to one of the side walls 22. The teeth on the slide fastener tapes 32 and 34 are adapted to be interlocked by means of a pair of slide fastener sliders 35, which work in the customary manner. Two of these sliders are preferably provided so that the cover can be disengaged from the side walls at any point to permit of ready access to any portion of the carrier.

The carrier, as described, can be readily mounted on the top of an automobile, and the base A may be levelled by means of the jacks C and D, whereupon the carrier may be extended as described and luggage may be easily stowed in the carrier. When no luggage is being carried, it is possible to collapse the carrier against the base A so that it will not offer as much wind resistance as when extended. The flaring shape of the side and end walls of the carrier will also reduce the wind resistance when the carrier is extended.

There is a strip 36 of flexible material, such as canvas, which is provided anchored to the inner central edge portions of the panels 9, and this strip runs across the central bar 6 above the same. Accordingly, by disengaging the screws 10 from the main frames 8, the panels 9 together with the canvas parts and other parts connected therewith can be removed from that portion of the base A consisting of the main frames 8 and the central bar 6 so that, if desired, lumber, a boat, or other articles can be carried by the remaining sections of the base with ease.

When the carrier is removed from the car top B, it can be folded up as shown in Fig. 4 and stowed away in small compass.

The carrier can be made of such a size as to cover the major portion of the top B of the car or to cover just a small portion of the top depending on the quantity of luggage to be held by the carrier. A large quantity of luggage can be carried by the carrier and the weight of this luggage can be distributed on the automobile top to cause the car to be loaded evenly fore and aft and to ride smoothly irrespective of the amount of luggage carried. Thus, even though a large quantity of luggage is carried by the automobile, it will not be necessary to load one end of the car heavier than the other as is the case when all luggage is carried in the trunk of the car.

The device is particularly useful for hunters and fishermen and for tourists and vacationers who are required to carry a considerable quantity of luggage and who often find it difficult to stow this luggage in the automobile with the facilities now offered.

It will be seen that a simple and highly useful article has been produced.

It will of course be understood that various changes may be made in the form, details, arrangements, and proportions of the various parts without departure from the scope of the present invention which, generally stated, consists in the matter shown and described and set forth in the appended claims.

What is claimed is:

1. An auto top luggage carrier comprising a base, means for mounting said base on the top of an automobile, a frame having no direct connection with and overlying said base and extensible upwardly therefrom, flexible interconnecting end and side walls secured to the edges of said base and to said frame, a flexible cover for said frame, and means for holding said frame extended from said base and collapsed against said base.

2. An auto top luggage carrier comprising a base having a central section and a pair of main sections pivotally connected to said central section, means for mounting said base on the top of an automobile, a pair of U-shaped frame members overlying said main base sections, joined flexible side and end walls secured at bottom and top edges respectively to the outer edges of said main base sections and to said frame members, means for holding said frame members in extended position above said base and permitting the collapse of said frame members downwardly against the base and a cover attached to the upper edge of one of said walls and releasably engageable with upper edge portions of other walls to close the top of the carrier.

3. The structure defined in claim 2, said first mentioned means including jacks for leveling the base sections.

4. The structure defined in claim 2 and a flexible strip running across the upper side of said central base section and connected to the adjacent edges of the main base sections.

5. An auto top luggage carrier comprising a base including a central bar, a pair of rectangular main frames pivotally connected to said bar at the outer edges thereof, panels carried by said main frames, U-shaped frame members overlying said panels, joining canvas side and end walls secured at their bottom edges to said panels and having hems at their upper edges within which said U-shaped frame members are received, a cover flap attached to the upper edge of one of said walls and releasably engageable with the upper edges of another of said walls, and a flexible strip secured to the edges of said panels adjacent said bar and overlying said bar, said panels being detachably securable to said main frames whereby the bar and main frames can be disengaged from the remaining parts, bails pivotally connected to said U-shaped frame members and running through slots in the canvas side walls, and spring clips attached to said panels and engageable with said bails whereby the upper portion of the carrier can be held in extended relation from said main frames.

6. An auto top luggage carrier comprising a base including a central bar, a pair of rectangular main frames pivotally connected to said bar at the outer edges thereof, panels carried by said main frames, U-shaped frame members overlying said panels, joining canvas side and end walls secured at their bottom edges to said panels and having hems at their upper edges within which said U-shaped frame members are received, a cover flap attached to the upper edge of one of said walls and releasably engageable with the upper edges of another of said walls, and a flexible strip secured to the edges of said panels adjacent said bar and overlying said bar, said panels being detachably securable to said main frames whereby the bar and main frames can be disengaged from the remaining parts, leveling jacks attached to said main frames and to said bar, and rubber sucker cups attached to the lower ends of said jacks for engaging the top of a car.

7. An auto top luggage carrier comprising a base including a central bar, a pair of rectangular main frames pivotally connected to said bar at the outer edges thereof, panels carried by said main frames, U-shaped frame members overlying said panels, joining canvas side and end walls secured at their bottom edges to said panels and having hems at their upper edges within which said U-shaped frame members are received, a cover flap attached to the upper edge of one of said walls and releasably engageable with the upper edges of another of said walls, and a flexible strip secured to the edges of said panels adjacent said bar and overlying said bar, said panels being detachably securable to said main frames whereby the bar and main frames can be disengaged from the remaining parts, jacks attached to said main frames for mounting the carrier on the top of a car and hook equipped straps attached to the sides of said main frames and engageable with the gutters to the sides of the top of a car.

8. The structure defined in claim 1, said means comprising bail-like members pivotally connected to said frame, said flexible side walls having slots therein through which said bail-like members extend, and catches attached to said base for engaging with said bail-like members.

9. An auto top luggage carrier comprising a base, means for mounting said base on the top of an automobile, a pair of U-shaped frame members overlying said base, joined flexible side and end walls secured at bottom and top edges respectively to the outer edges of said base and to said frame members, means for holding said frame members in extended position above said base and permitting the collapse of said frame members downwardly against the base and a cover attached to the upper edge of one of said walls and releasably engageable with upper edge portions of other walls to close the top of the carrier.

GERALD D. GODWIN.

REFERENCES CITED

The following references are of record in the file of this patent:

UNITED STATES PATENTS

| Number | Name | Date |
| --- | --- | --- |
| 2,068,960 | Northrup et al. | Jan. 26, 1937 |
| 2,134,635 | LeBoeuf | Oct. 25, 1938 |
| 2,387,779 | Strauss | Oct. 30, 1945 |

FOREIGN PATENTS

| Number | Country | Date |
| --- | --- | --- |
| 44,648 | France | Dec. 15, 1934 |